United States Patent
Grutsch et al.

[15] 3,680,847
[45] Aug. 1, 1972

[54] METHOD OF AND APPARATUS FOR AERATING WATER

[72] Inventors: James F. Grutsch, Hammond; Russell C. Mallatt, Crown Point; Robert G. Mowers, Griffith, all of Ind.

[73] Assignee: Standard Oil Company, Chicago, Ill.

[22] Filed: Aug. 31, 1970

[21] Appl. No.: 68,461

[52] U.S. Cl. ..................261/91, 261/92, 261/120, 261/124, 210/220, 261/DIG. 75
[51] Int. Cl. ................................................B01f 3/04
[58] Field of Search..........261/91, 92, 120, 122, 124, 261/DIG. 47; 210/220

[56] References Cited

UNITED STATES PATENTS

| | | | |
|---|---|---|---|
| 3,320,160 | 5/1967 | Welles, Jr. et al. | 261/91 |
| 2,827,268 | 3/1958 | Staaf | 261/91 |
| 3,405,920 | 10/1968 | Lefrancois | 261/124 |
| 3,338,415 | 8/1967 | Parks | 261/124 |
| 1,354,489 | 10/1920 | Johnson | 261/91 |

FOREIGN PATENTS OR APPLICATIONS

| | | | |
|---|---|---|---|
| 545,897 | 3/1932 | Germany | 210/220 |

Primary Examiner—Tim R. Miles
Assistant Examiner—Steven H. Markowitz
Attorney—Arthur G. Gilkes, William T. McClain and John J. Connors

[57] ABSTRACT

Disclosed is a highly efficient method of and apparatus for transferring atmospheric oxygen to water by aerating a body of water at or near its edges to generate in the water's upper stratum converging currents which move toward the central section of the body of water. Conventional pumping, brush-type or turbine-type aerators can be used, but for best results a novel apparatus of our design is used. Preferably, the converging currents are directed slightly off-center so that a whirlpool is formed at this section. Alternatively, a contaminated body of water can be aerated at a region about midway between the central section of the body of water and the periphery of the body of water to generate in the water's upper stratum some converging currents which move toward the central section of the body of water and some diverging currents which move toward the periphery of the body of water.

9 Claims, 17 Drawing Figures

INVENTORS.
James F. Grutsch
Russell C. Mallatt
Robert G. Mowers

BY John J. Connors
ATTORNEY

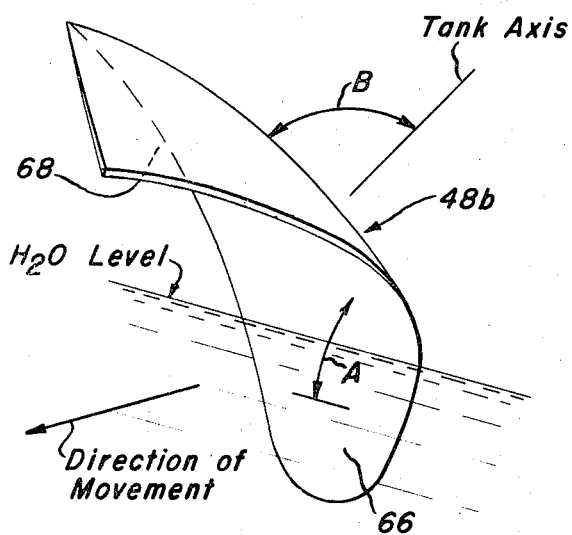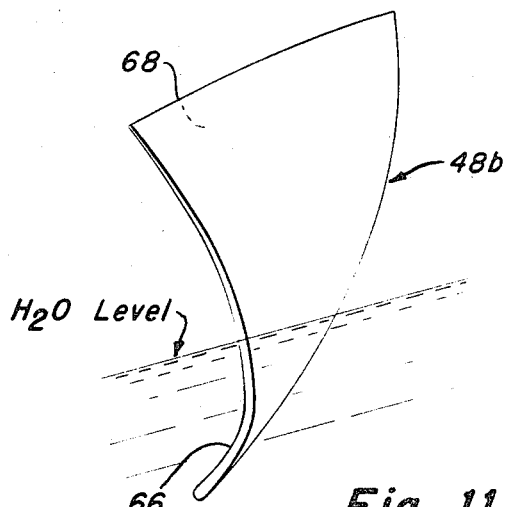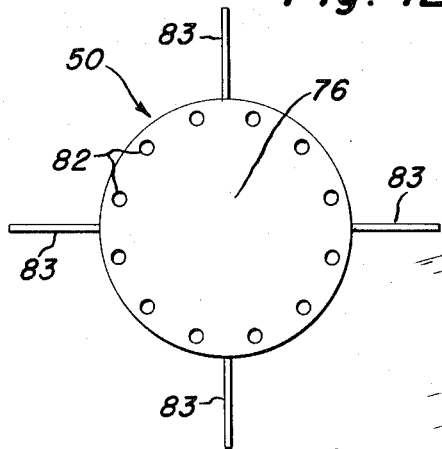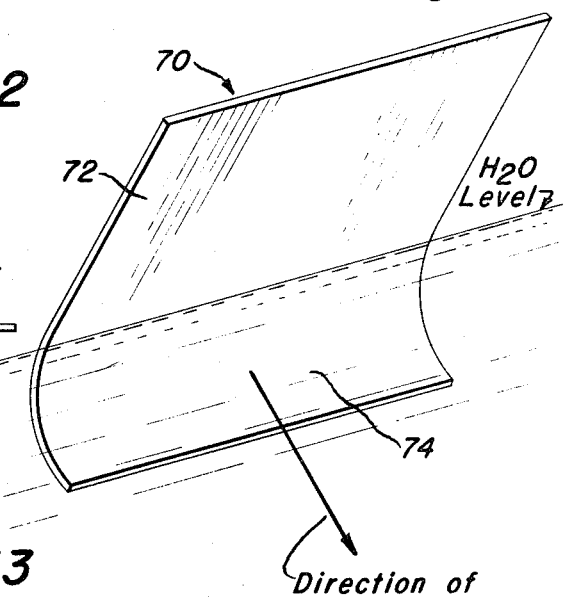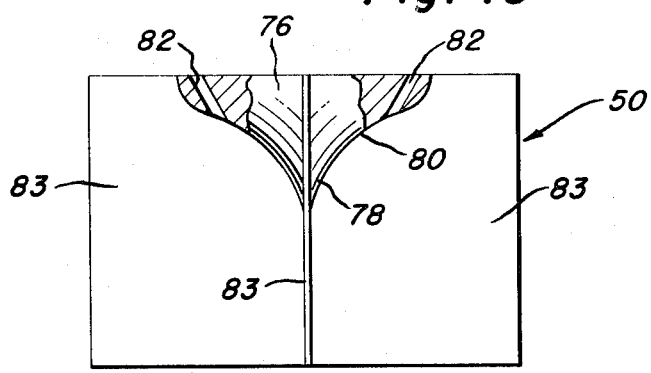

3,680,847

METHOD OF AND APPARATUS FOR AERATING WATER

BACKGROUND

Biochemical water purification processes normally require the transfer of atmospheric oxygen to the water being purified. This oxygen is necessary to sustain the aerobic microorganisms which through their biological activity remove biologically degradable contaminants from the water. Mechanical surface aerators such as pumping, brush-type or turbine-type, are commonly used to achieve oxygen transfer. In general, such aerating equipment is located at the center of the tank which holds the polluted water. This equipment sprays water into the air and generates in the water's upper stratum diverging currents which move radially away from the center of the tank toward the periphery of the tank. These currents strike the sidewalls of the tank and are directed downwardly, so that in the water's lower stratum currents are moving in an opposite direction to the currents in the upper stratum. We have found that, when aerators are used in this conventional manner, the amount of oxygen transferred to the water phase per horsepower-hour does not increase proportionately with the increase in the horsepower of the equipment. Further, the amount of oxygen transferred depends upon the volume of water being aerated. For instance we found that, when a twenty horsepower unit is used in a 40 ft. diameter tank containing 100,000 gallons of water, the oxygen transfer was 2.7 pounds of oxygen per horsepower-hour. In a 60 ft. diameter tank containing 240,000 gallons of water, the oxygen transfer was only 1.8 pounds of oxygen per horsepower-hour.

THE INVENTION

We have now discovered that aerator efficiency is greatly increased by aerating at a plurality of different remote points about the tank's center, preferably at the periphery of the tank, to generate in the water's upper stratum converging currents which move toward the center of the tank. By using this novel aerating method we have substantially increased the amount of oxygen transferred to the water phase per horsepower-hour of energy expended. Based on this discovery, we have also designed a novel aerating apparatus for carrying out our aerating method. The attached schematic drawings and accompanying description disclose the important features of our method and apparatus.

DESCRIPTION OF DRAWINGS

FIGS. 9 and 10 are two different perspective views of the scoop-type blades shown in FIGS. 5 and 6.

FIG. 11 is an alternate embodiment of the ski-type blades shown in FIGS. 5 and 6.

FIG. 12 is a plan view of the baffle shown in FiG. 5.

FIG. 13 is a side elevational view of the baffle shown in FiG. 12.

EMBODIMENTS OF THE INVENTION

Figure 1:
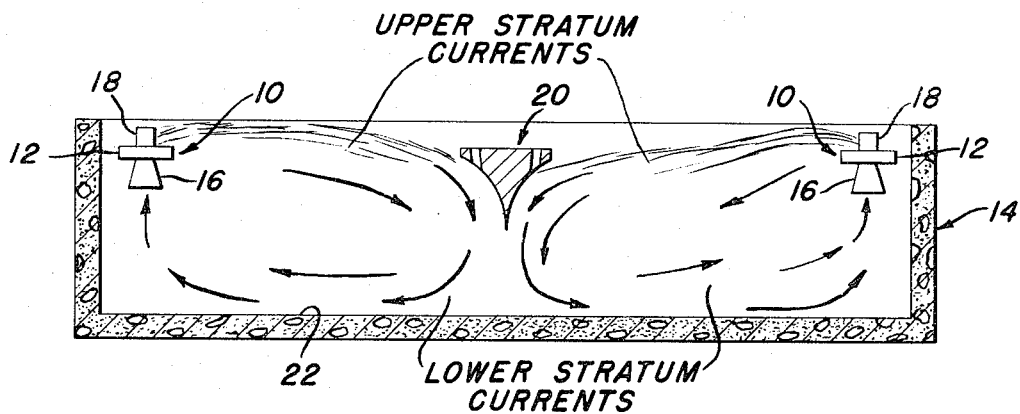
FIG. 1 is a cross-sectional view of FIG. 2 taken along line 2—2.
Figure 2:
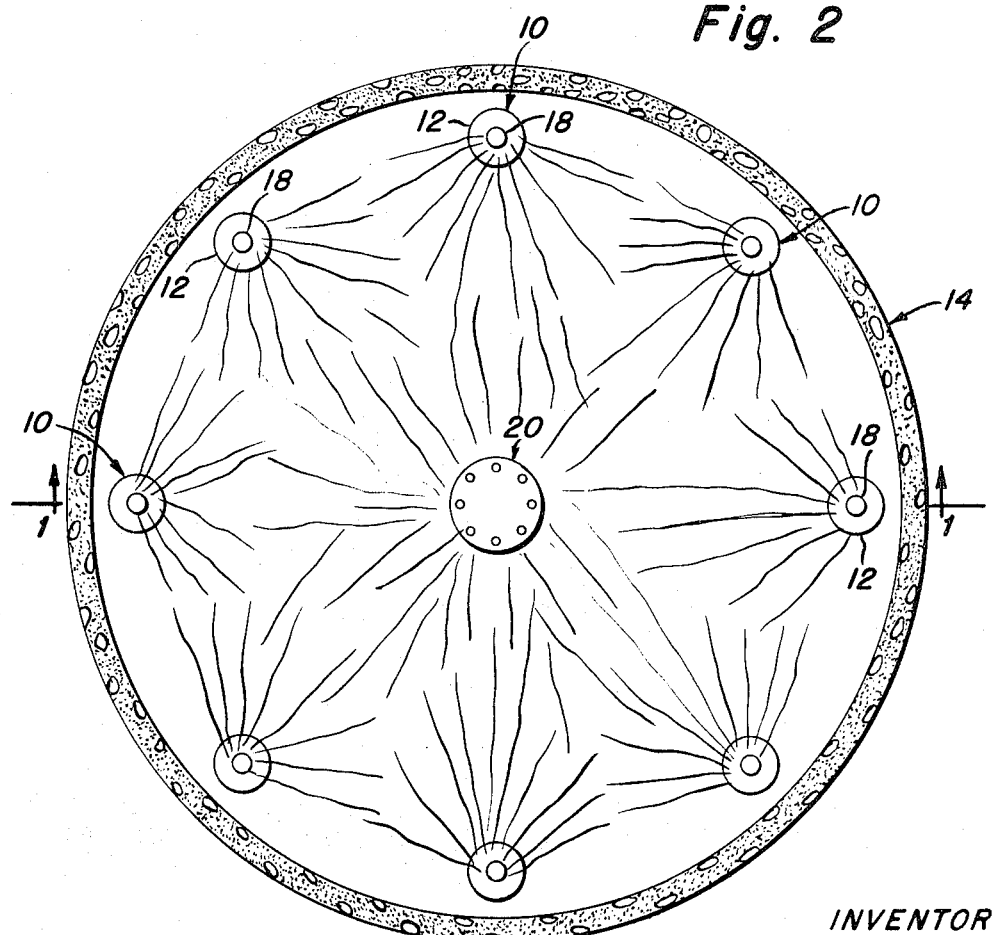
FIG. 2 is a plan view of one embodiment of our invention.

FIGS. 1 and 2 show one embodiment of our invention using a plurality of pumping aerators 10, sold by Welles Products Corporation under the trade name AQUALATOR. These aerators 10 are at the periphery of tank 14 that holds polluted water including dispersed aerobic micro-organisms. Each aerator 10 includes float 12 which is anchored to the tank, an intake end 16 and an outlet end 18. Surrounding water is drawn into intake ends 16 and is then spewed forth from outlet ends 18. Water is sprayed into the air through an arc of about 180° and is thus aerated. Aerators 10 are disposed all around the circumference of tank 14 so that in the water's upper stratus currents are established which flow toward the central section of the tank. Baffle 20 at the center of tank 14 directs these upper currents downwardly toward bottom 22 of the tank. This establishes in the water's lower stratum currents moving from the center of tank 14 toward the periphery of the tank. In the water's upper stratum the currents converge as they move toward the central section, and in the water's lower stratum currents diverge as they move toward the tank's periphery.

Figure 3:
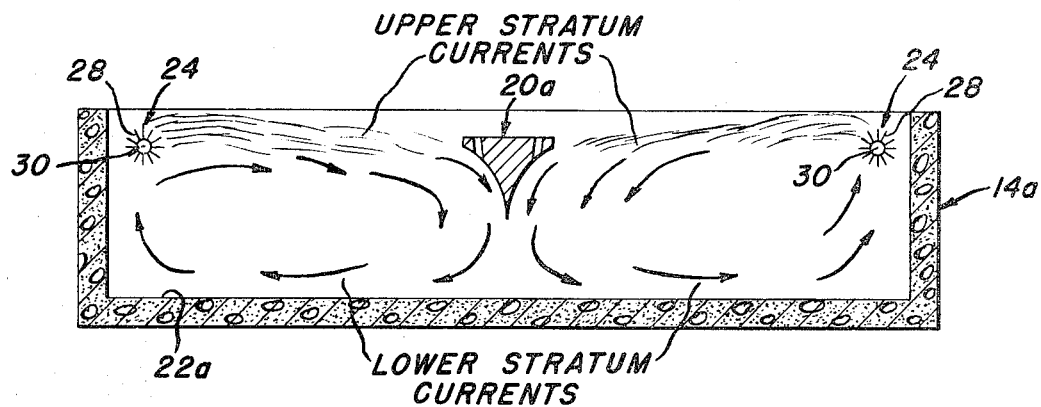
FIG. 3 is a cross-sectional view taken along line 3—3 of FIG. 4.
Figure 4:
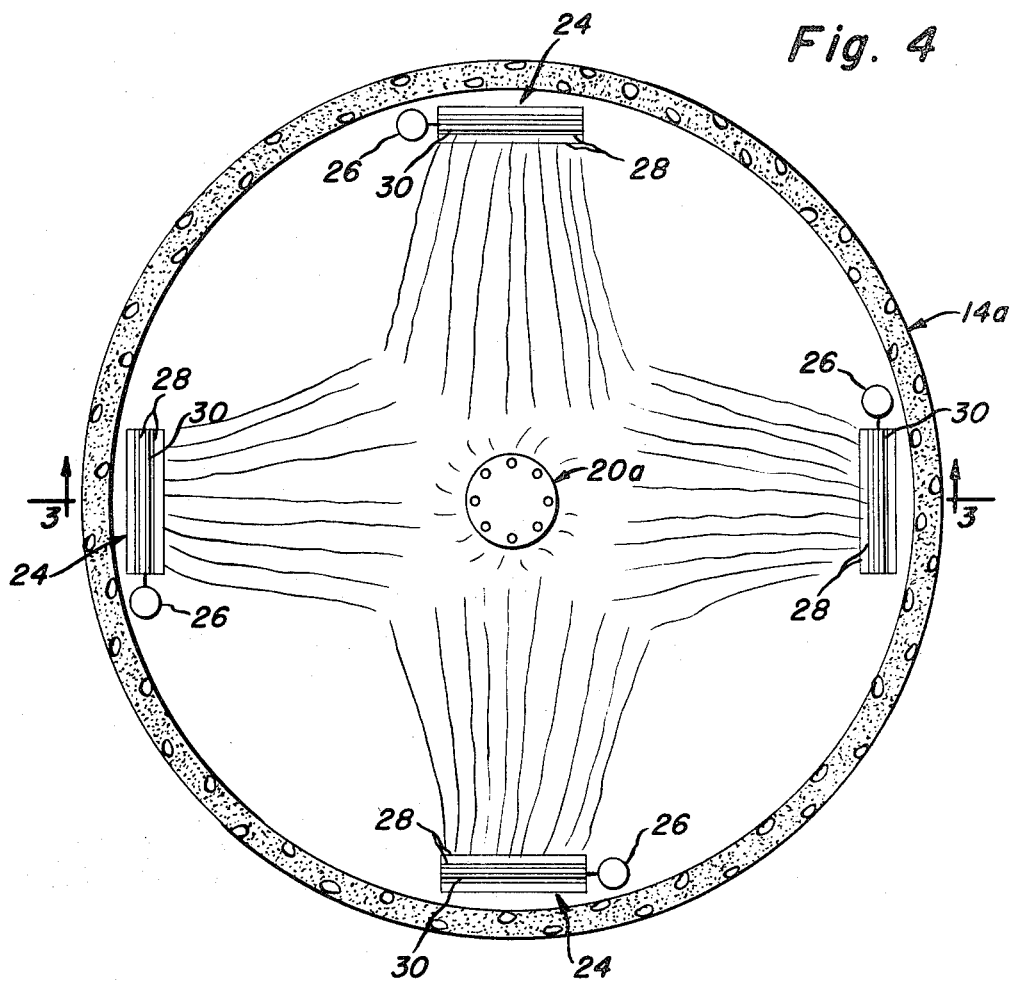
FIG. 4 is a plan view of a second embodiment of our invention.

FIGS. 3 and 4 show a second embodiment of our invention where rotating brush aerators 24, such as sold by Beloit-Passavant Corporation, are used in place of the AQUALATOR aerators. These rotating brush aerators 24 each include a motor 26 which causes the aerators to rotate in a direction that causes surface waters to move toward the central section of tank 14a. Blades 28 bristling forth from drive shafts 30 of aerators 24 beat air into water and churn the water's surface, throwing the surrounding water into the air and thus aerating the water. Since aerators 24 are disposed all around the periphery of tank 14a, a cycling current of water is established which in the water's upper stratum moves from the periphery toward the center of tank 14a, converging at or near the center where it is directed downwardly by baffle 20a toward bottom 22a of the tank. In the water's lower stratum diverging currents then move from the center of tank 14a toward the periphery of the tank.

Figure 5:
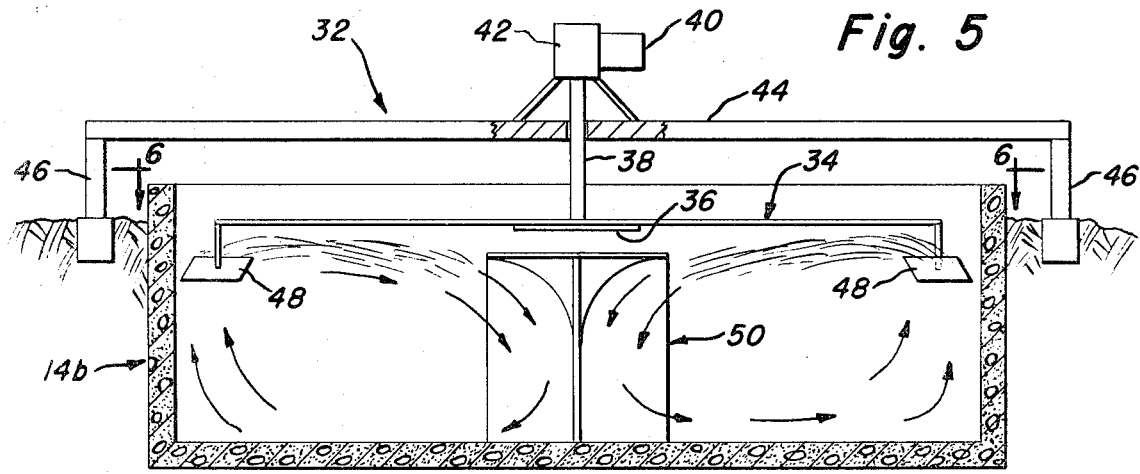
FIG. 5 is a cross-sectional view of a third embodiment of our invention.
Figure 6:
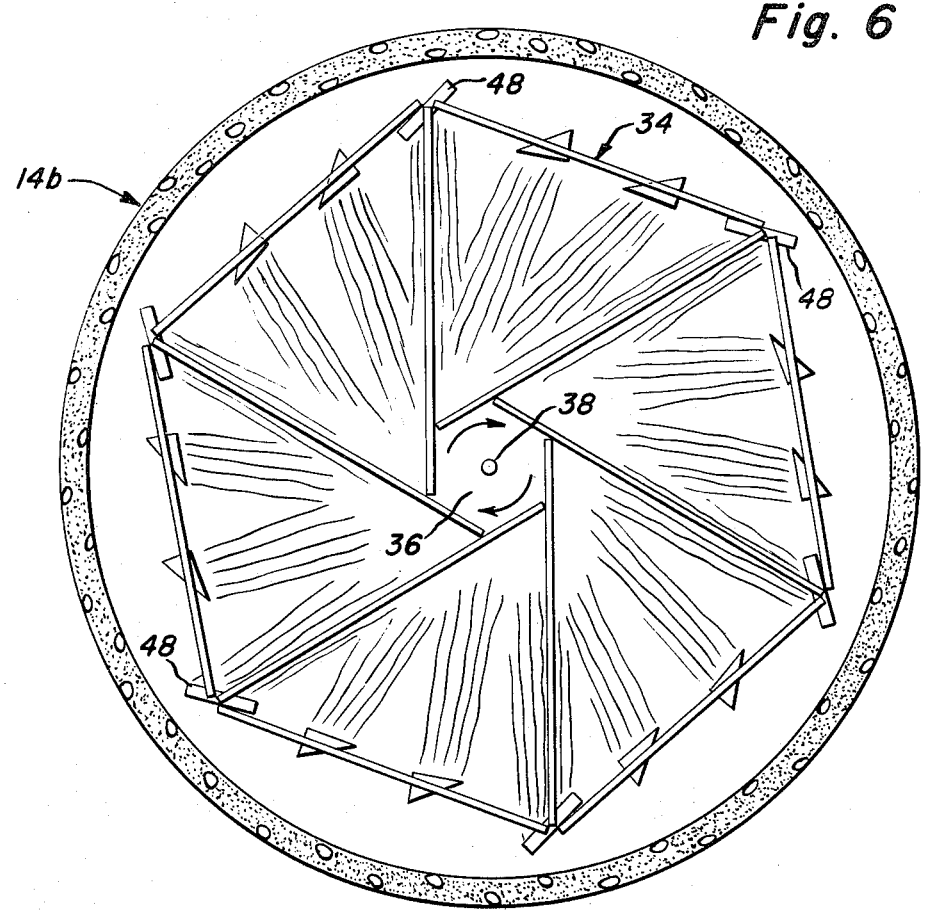
FIG. 6 is a cross-sectional view taken along line 6—6 of FIG. 5.

FIGS. 5 and 6 show a third embodiment of our invention where a novel turbine-type aerator 32 of our invention is used to churn up the peripheral waters held in tank 14b. This embodiment includes horizontal support structure 34 connected through hub 36 to the vertical drive shaft 38 of motor 40. Optionally, motor 40 may be equipped with gear reducer 42. Motor 40 is mounted on beam 44 which extends across the open top of tank 14b and is supported at its ends by blocks 46. Blades 48, attached to the outer edge of support structure 34, are used to pump and thereby aerate the water. These blades 48 churn up the peripheral waters in tank 14b as drive motor 40 rotates support structure 34. Blades 48 are at an appropriate angle to direct churning surface waters toward the center of tank 14b, and at the center is baffle 50 which then directs these waters downwardly. In the water's upper stratum converging currents move from the periphery toward the center of tank 14b, and in the water's lower stratum diverging currents move from the center of the tank toward its periphery.

Figure 7:
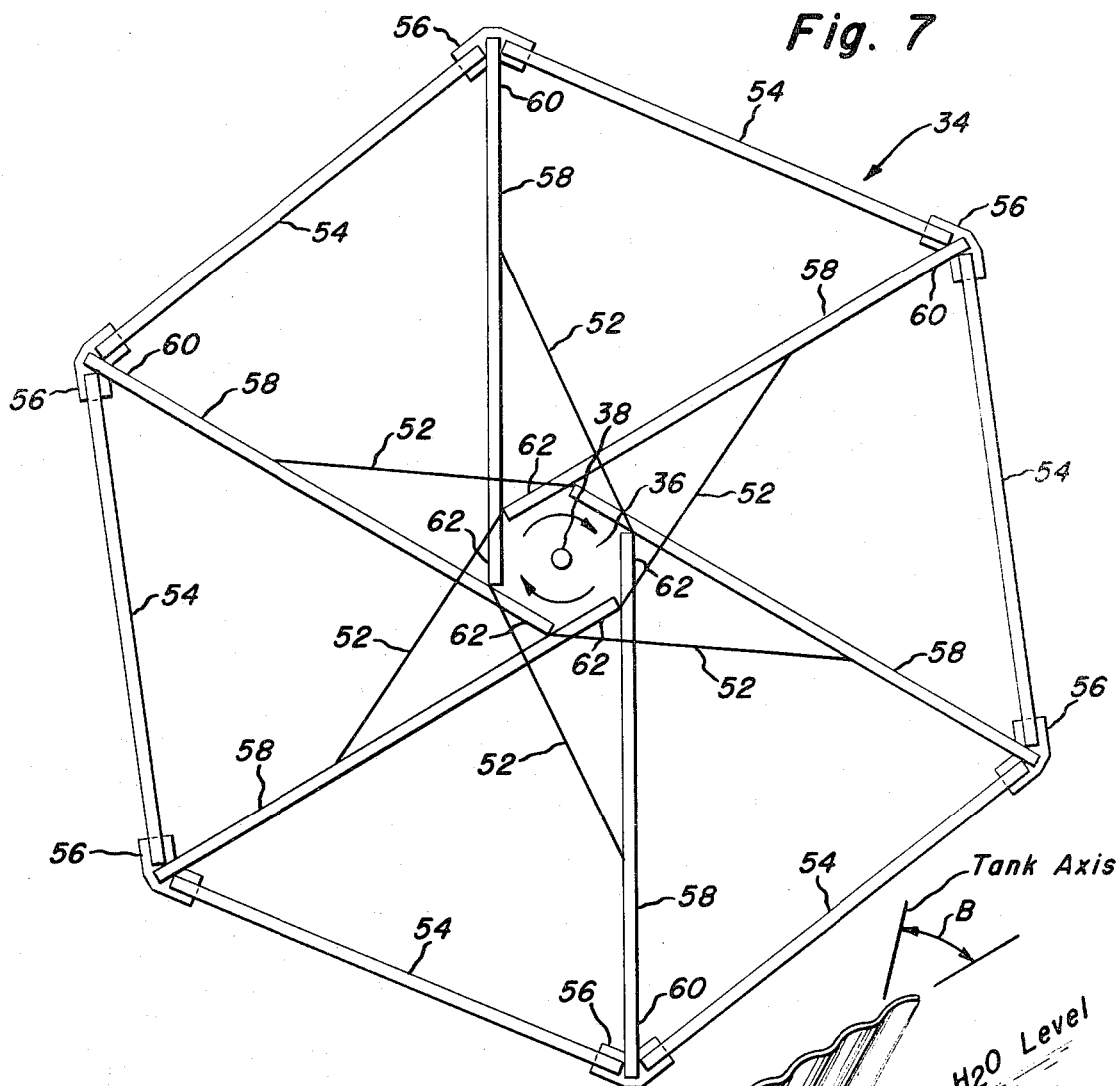
FIG. 7 is a plan view of the support structure shown in FIGS. 5 and 6.

Further details of support structure 34 are shown in FIG. 7. Though not required, support structure 34 preferably has a hexagonal configuration. When such a hexagonal configuration is employed, the twisting forces exerted on struts 58 of structure 34 can be handled using lightweight cables or rods 52. This will cut down on the weight of aerators 32, reducing costs and facilitating installation. The hexagonal configuration is outlined by six braces 54 which are bolted or welded to connecting pieces 56. Six struts 58 project outwardly from hexagonal hub 36 toward the periphery of tank 14b. Ends 60 of these struts 58 may terminate at the corners of the hexagonal structure and they are bolted or welded to connecting pieces 56 also at these corners. Ends 62 of struts 58 terminate near but slightly off-center of structure 34. These ends 62 are bolted or welded to hub 36, and each end 62 has a cable 52 connected to it. Each cable 52 ties one end of one strut to the mid-section of a strut three away from the end of the one strut to which the cable is attached. As drive motor 40 turns, it exerts a twisting force on support structure 34 and particularly upon struts 58. If the struts radiated exactly from the center of structure 34, this twisting force would tend to be exerted as a normal force applied to the struts. Such a normal force would tend to bend each strut about its longitudinal axis. However, with ends 62 off-center, this torque force is transferred to cables 52 and exerted along the longitudinal axis of the cables.

Figure 8:
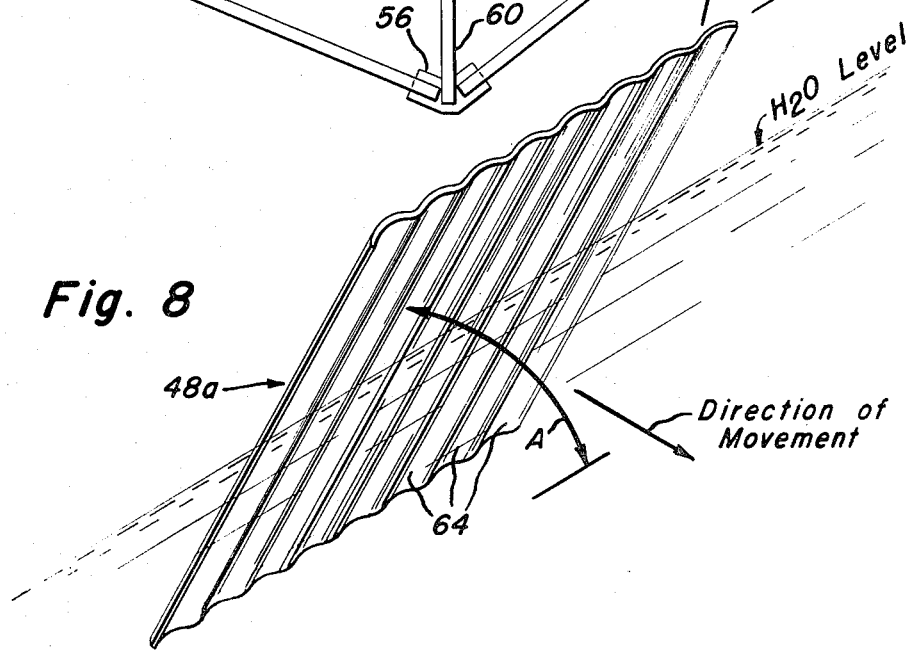
FIG. 8 is a perspective view of the ski-type blades shown in FIGS. 5 and 6.

FIGS. 8 through 11 show examples of the various types of blades 48 which can be used to churn the water's surface. FIG. 8 shows a corrugated ski-type blade 48a which dips into the water in the manner depicted in the drawing. Although a smooth surface blade could be used, a corrugated ski-type blade 48a is preferred because the amount of water thrown into the air will be maximized. Since the water tends to slide laterally across the face of a flat ski-type blade, the grooves 64 of corrugated blade 48a direct this water upwardly. The blade angle A of inclination relative to the water's surface for such a blade 48a ranges between about 30° and about 60°, preferably about 45°, and the blade angle B relative to a line along the radius of the tank ranges between about 30° and about 60°. About 0 to 50 percent of the ski-type blade is above the water's surface.

FIGS. 9 and 10 show a scoop-type blade 48b. This type blade includes concave lower section 66 which dips into the water and scoops up water as it moves, and upper section 68 which tapers outwardly from section 66 and twists inwardly toward the center of tank 14b so that the water scooped up is sprayed toward the center section of the tank. The outward tapering of upper section 68 tends to disperse the spray over a wide area. This maximizes aeration. The blade angle A of inclination relative to the water's surface for such a blade 48b ranges between about 0° and about 90°, and the blade angle B relative to the surface of the water ranges between about 30° and about 60°. About 50–90 percent of the blade is above the water's surface.

In addition to a horizontal force vector opposite to the direction of movement through the liquid being aerated, ski-type blade 48a tends to exert an upward force on support structure 34, lifting this structure up and away from the water, and scoop-type blade 48b tends to exert a downward force on the support structure, pulling this structure toward the water. By carefully selecting the proper number of ski-type blades 48a and scoop-type blades 48b, and properly positioning these blades at the edge of support structure 34, the upward and downward forces exerted on the support structure are cancelled out. In other words, the resultant force equals zero.

FIG. 11 shows an alternate blade design which serves as both a ski-type and a scoop-type blade. This blade 70 has a generally flat upper section 72 which acts like a ski blade and a lower concave section 74 which serves to scoop up water. These sections 72 and 74 are carefully balanced so that the upward lifting force generated by section 72 is cancelled by the downward pulling force provided by scooping section 74. Thus all the blades 48 may be of this single design, however, we prefer to use the two different types as described above, since it is generally easier to balance the upward and downward forces by simply varying the number and positions of the two different types of blades.

FIGS. 12 and 13 show the preferred baffle 50 to be used in our apparatus 32. This baffle 50 has a generally conical shaped upper member with a base 76 near the water's surface, an apex 78 submerged below the water's surface and pointed downwardly away from the water's surface, and a sidewall 80 joining the base and apex. Air passageways 82 extend through baffle 50 and have one end in the base and another end in the sidewall. This baffle 50 is seated on four partitions 83 which rest on bottom 22b of tank 14b. The partitions 83 act as vertical baffles to control the rotational or swirling motion of the liquid being aerated. As currents in the water's upper stratum wash up against sidewall 80, the curvature of the sidewall directs these currents down toward bottom 22b of tank 14b. A venturi effect is thus effectuated as the water moves past the lower end of the air passageways 82, sucking air into the passageways and then into the passing water.

Figure 14:
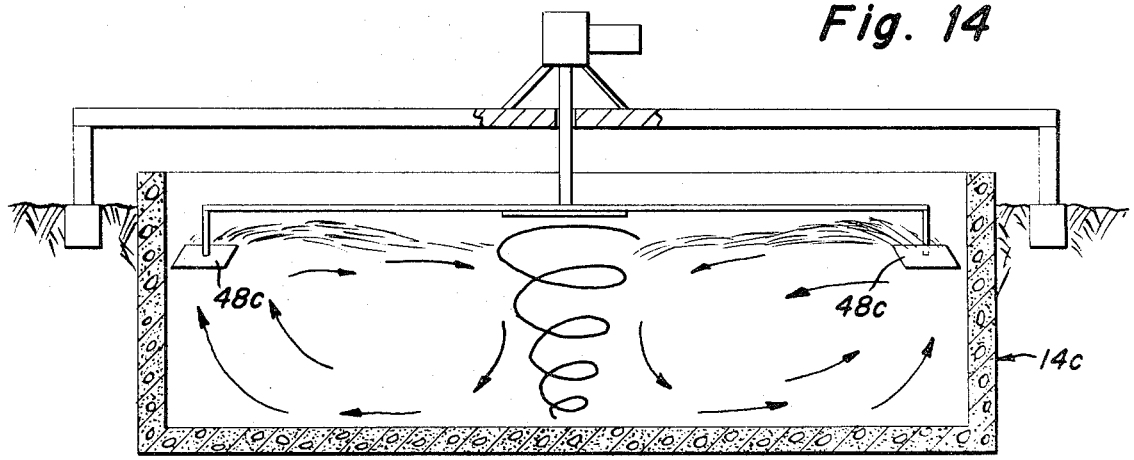
FIG. 14 is a cross-sectional view of a fourth embodiment of our invention.
Figure 15:
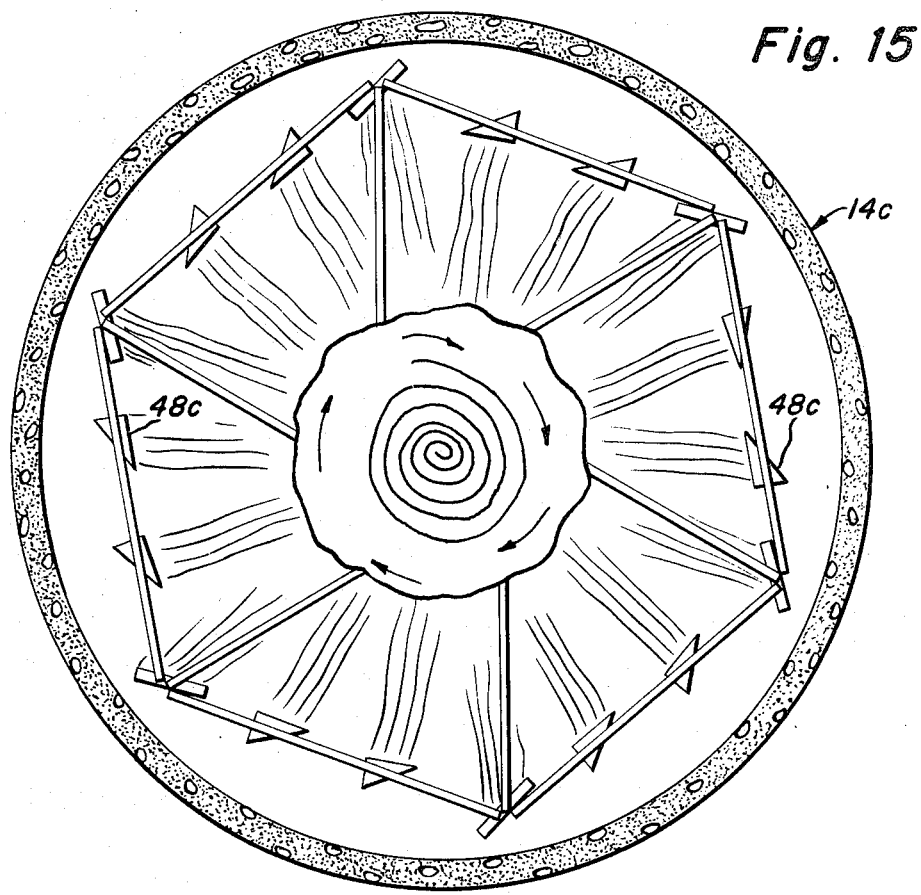
FIG. 15 is a plan view of the apparatus shown in FIG. 14 with sections broken away and mounting and drive means deleted.

FIGS. 14 and 15 illustrate a fourth embodiment of our invention which is substantially the same as the embodiment shown in FIGS. 5 and 6 except baffle member 50 is not used. In this embodiment a whirlpool is established at the central section of the tank by properly aligning blades 48c so that the converging currents moving toward the central section of tank 14c are slightly off-center. This will at the center of tank 14c generate a whirlpool which tends to suck air into the recirculating water and effect dispersion of air bubbles throughout the body of the liquid being aerated.

Figure 16:
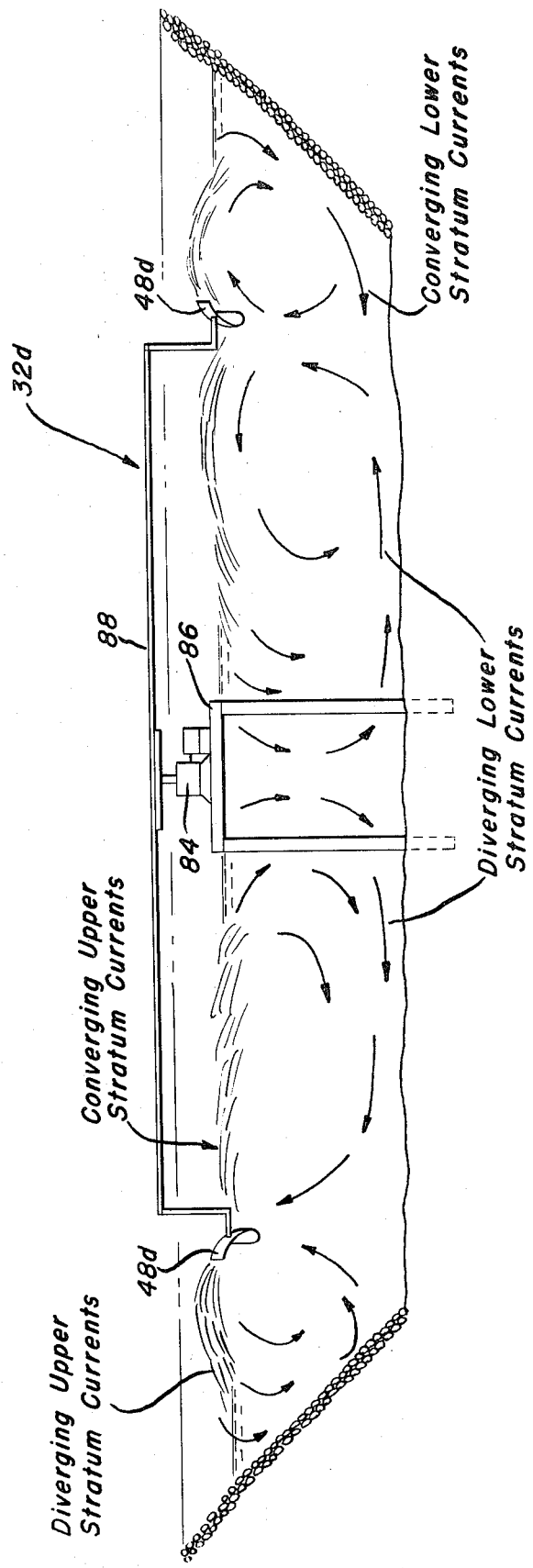
FIG. 16 is a cross-sectional view of the fifth embodiment of our invention.
Figure 17:
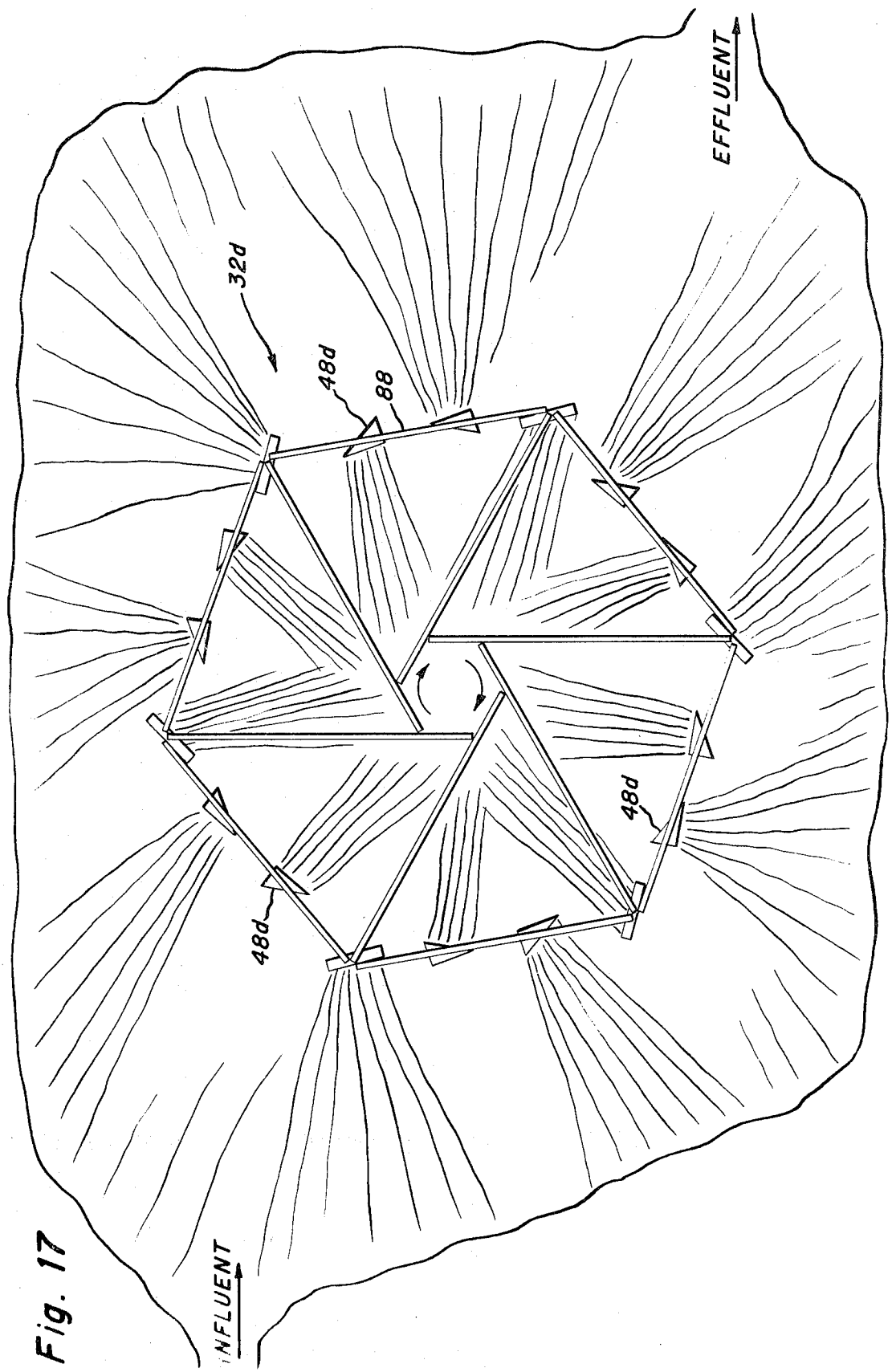
FIG. 17 is a plan view of the apparatus shown in FIG. 16.

FIGS. 16 and 17 show a fifth embodiment of our invention in which our improved apparatus 32d is disposed in an outdoor lagoon having a large surface area covering several thousand square feet or more. Churning of surface water is effected at about midway between the shoreline of the lagoon and the center of the lagoon. Drive motor 84, mounted on a pier 86 near the center of the lagoon, rotates support structure 88 carrying blades 48d which churn surface waters. Both ski-type blades and scoop-type blades are connected to the edge of support structure 88. This support structure 88 is substantially the same as that shown in FIG. 7, and the only significant difference between apparatus 32d and previously described turbine-type aerators 32 and 32b is that blades 48d are disposed to direct water both toward the central section of the lagoon and toward the shoreline of the lagoon. As best seen in FIG. 16, the revolving aerator apparatus 32d generates surface currents which move in the water's upper stratum away from blades 48d both toward the central section of the lagoon and toward the shoreline. Those currents moving toward the central section converge; those currents moving toward the periphery diverge. The converging currents are slightly off-center so that a whirlpool is established at the center of the lagoon. In the water's lower stratum currents move from the periphery of the lagoon toward blades 48d and also from the center of the lagoon toward the blades. Those currents moving away from the lagoon's shoreline tend to converge; those moving away from the lagoon's center tend to diverge.

Our basic method is carried out by all of the above described embodiments. According to this basic method, a body of water polluted with biologically degradable contaminants, and containing aerobic micro-organisms which degrade the contaminants, is aerated at different remote points about the center of the body of water in a manner which generates in the water's upper stratum converging currents which move toward the central section of the body of water. Aerating is achieved by throwing the water into the air and/or beating or otherwise forcing air bubbles into the water's surface. We believe the reason for the increased efficiency provided by our method is due to the maintenance of a high degree of turbulence in the body of water as the currents flow toward the central section, accomplished by a comparatively low amount of pumping horsepower. We believe the momentum imparted to the water is reinforced by the converging currents to establish turbulence which holds the entrained air in the water for a longer period of time than was hitherto possible at the same expenditure of pumping energy. Thus a more complete oxygen transfer is achieved per unit of horsepower energy expended.

The advantages of our method and apparatus are manifold:

1. Using our novel apparatus, water is stirred, pumped and sprayed into the air at relatively low velocities. Conventional pumping aerators move the water at high velocities and much energy is expended merely on moving the water rather than entraining air in the water. Moreover, low water velocities improve operation of the activated sludge process since the sludge particles composed of microorganisms are not subject to high shearing forces which fragment and disperse them and decrease their propensity to flocculate. Conventional aerators tend to break these particles apart so that they are carried through the clarifier, instead of being entrapped therein, and thereby contribute to decreased purification efficiency of the activated sludge process.

2. The spray of water provided by our novel apparatus is finer and more widespread, being dispersed over a large area of the liquid being aerated, for better air-water particle contact. Using conventional pumping aerators some of the water as it leaves the outlet end of this aerator tends to be buried under the overhead spray and cannot achieve the desirable air-water particle contact.

3. As the horsepower on our novel apparatus is increased, additional blades are simply attached to the support structure. Also, by properly positioning these blades, our aerator has the capability of pumping and spraying water in two directions, 180° apart. Conventional aerators do not have this capability which is particularly useful in aerated lagoon-type waste water treating plants, a type of biological treatment receiving increasing acceptance and popularity.

4. Our novel apparatus is also particularly useful in treating foaming waste water. Conventional aerators tend to generate massive quantities of foam as the foaming waste water is aerated, and permit the foam to accumulate and interfere with operations. With our apparatus the foam is recirculated to the central part of the tank and immediately caught up in the whirlpool, rather than being dispersed across the entire water surface, and is recontacted with the microorganisms in the body of liquid under aeration thereby providing for the biological destruction of the contaminants causing foaming.

5. In the design of our novel apparatus the motor and gear reducer are as remotely located from the water spray as is physically possible. Very little water rains on the motor and gear reducer, thus avoiding the deleterious effects of such water spray and ice formation in cold weather.

We claim:

1. In purifying a body of water polluted with biologically degradable contaminants and containing aerobic micro-organisms which degrade said contaminants, the step of aerating the contaminated water at a plurality of different remote points about the center of the body of water to generate in the water's upper stratum converging currents which move toward the central section of said body of water, generating a whirlpool at said central section and establishing in the water's lower stratum diverging currents which move away from the central section of said body of water.

2. Apparatus comprising:
tank means holding water;
mounting means above the water in the tank means;
drive means mounted on said mounting means, said drive means including a generally vertically extending drive shaft which rotates;
support means coupled to said drive shaft which includes generally horizontal structural means disposed above the water, said structural means extending outwardly from the shaft and having ends terminating near the periphery of the tank means; and blade means mounted on the ends of said structural means, said blade means being partially submerged in the water and disposed to throw water into the air toward the central section of the tank means as the support means is rotated by the drive means.

3. The apparatus of claim 2 wherein some of the blade means are of the type that ski across the water's surface and provide an upward lifting force, and some of the blades are of the type that scoop up water and provide a downward pulling force, the number of said different blades being balanced so that the upward lifting force and the downward pulling force tend to cancel out.

4. The apparatus of claim 2 wherein the blade means have one section which acts to ski across the water's surface and provide an upward lifting force and another section which acts to scoop up water and provide a downward pulling force, said sections being balanced so that the upward lifting force and the downward pulling force tend to cancel out.

5. The apparatus of claim 2 including baffle means at or near the center of the tank means which directs downwardly water being moved toward said central section.

6. The apparatus of claim 2 wherein the baffle means comprises a generally conical member having a base near the surface of the body of water, an apex submerged below the water surface and pointed downwardly away from said surface, and a sidewall joining the base and apex.

7. The apparatus of claim 6 wherein said member has air passageways means therein extending through said member and having one end in the base and another end in the sidewall of the member.

8. The apparatus of claim 2 wherein the blade means direct the water slightly off-center so that a whirlpool is formed at said central section.

9. The apparatus of claim 2 wherein the support means has a generally hexagonal configuration and includes at least six struts, each having one end at one of the six corners of the hexagonal support means and each having another end near but slightly off the center of the hexagonal support means, and cables tying the struts together.

* * * * *